COMPATIBLE STEREOPHONIC SYSTEM

Filed Oct. 27, 1958

3 Sheets-Sheet 1

INVENTOR.
MURRAY G. CROSBY
BY James and Franklin
ATTORNEYS

INVENTOR.
MURRAY G. CROSBY
BY James and Franklin
ATTORNEYS

INVENTOR.
MURRAY G. CROSBY
BY James and Franklin
ATTORNEYS

United States Patent Office 3,047,666
Patented July 31, 1962

3,047,666

COMPATIBLE STEREOPHONIC SYSTEM

Murray G. Crosby, % Crosby Laboratories Inc., 299 Robbins Lane, Syosset, N.Y.

Filed Oct. 27, 1958, Ser. No. 769,718
16 Claims. (Cl. 179—15)

This invention relates to the binaural transmission and reception of sound, and more particularly to such a system described in my U.S. Letters Patent 2,851,532, granted September 9, 1958.

In that system the microphone outputs are added to obtain a summation signal, and are subtracted to obtain a subtraction signal The summation signal is transmitted over one channel, and the subtraction signal is transmitted over the other channel, both preferably over the full frequency range of the signal. At the receiver the summation and subtraction signals are added to reproduce one microphone output, and are subtracted to reproduce the other microphone output. An important gain in signal to noise ratio is obtained.

In experimental operation of the system of said Patent 2,851,532, I have found that the sum and difference combinations at the receiver sometimes suffered a gradual deterioration of subtraction and addition as the modulation frequency was raised. Due to unequal time of transmission between the main channel and the subcarrier channel, proper phase cancellation of the receiver combinations would occur for the lower modulation frequencies, but as the frequencies become higher (of the order of 5,000 or 6,000 cycles) the phase became so changed that the optimum combinations no longer occurred. Thus, while the proper phase relation occurred for the lower audio frequencies, and continued for a rather large portion of the audio frequency band, complete addition and subtraction did not occur for high audio frequencies. The degree of cancellation was sufficient however for the stereo effect to be realized. On the other hand, with proper time delay equalization, which is the object of this invention, the addition and subtraction will be extended over the complete audio frequency range to not only further refine and improve the stereo reproduction, but also to insure full realization of signal-to-noise ratio gain effected by the sum and difference technique. This signal-to-noise ratio gain depends upon arithmetic addition (plus or minus) of the corresponding components of the microphone channels transmitted over the main and subcarrier channels. Thus the portion of microphone A that is transmitted over the main channel should add in phase at the receiver to make an arithmetic addition to the corresponding portion of microphone A that is transmitted over the subcarrier channel. The same applies to the portions of microphone B. Under these circumstances the resulting signal at the receiver effects a 6 db improvement in signal-to-noise ratio relative to the signal-to-noise ratio on the subcarrier channel alone.

To accomplish the foregoing general objects, and other more specific objects which will hereinafter appear, my invention resides in the transmission and time delay circuitry elements and their relation one to another, as are hereinafter more particularly described in the following specification. The specification is accompanied by drawings in which:

FIG. 3 is a simplified diagram for a receiver designed to receive the transmission from the transmitter of FIG. 1 or FIG. 2.

Figure 1:
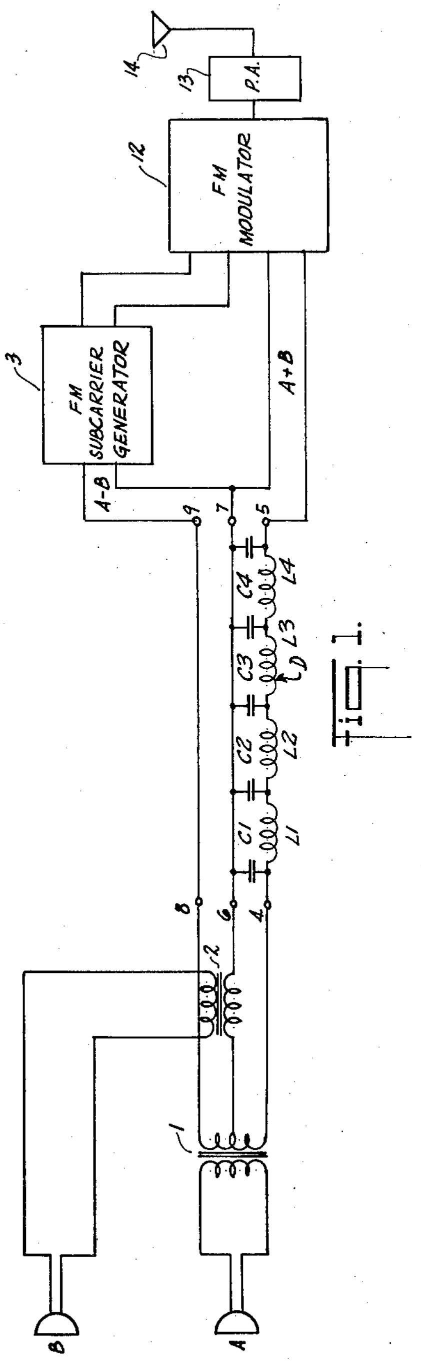
FIG. 1 is a simplified diagram for a carrier and subcarrier transmitter having delay means in the main channel.

Referring to the drawing and more particularly to FIG. 1, the transmitter there shown comprises spaced microphones A and B. The transformers 1 and 2 act as means to add the microphone outputs in order to obtain a summation signal, and to subtract the microphone outputs in order to obtain a subtraction signal. The network D acts as a means to delay one of the summation and subtraction signals relative to the other. The summation signal is preferably transmitted over the main channel so as to provide a balanced reception for the monaural listener, as described in my U.S. Patent 2,851,532. This gives the advantage of "compatibility."

The modulation by each of said signals is preferably carried out over substantially the full frequency range of the signal.

Delay is introduced in the subcarrier (assuming there is a direct modulator in unit 3), and further delay may be introduced in the subcarrier receiver 17 of the receiver apparatus shown in FIG. 3. It is to compensate for these delays that the delay network D is provided in the main channel of the transmitter shown in FIG. 1. Thus the delay in network D may be made greater than the delay in the subcarrier channel of the transmitter, in order to compensate for additional delay in the receiver. (In some cases there may be such circuitry as to happen to provide a fortuitous correction of unequal time delay, but this is unlikely.)

FIGS. 1 and 3 show a typical FM multiplex system using the compatible sum-and-difference combination at the transmitter and receiver. Microphones A and B are mixed by means of transformers 1 and 2 to apply the sum combination, A plus B, to the main channel of FM modulator 12, and the difference combination, A minus B, to the FM subcarrier generator 3, and thence to the FM modualtor 12. The output of the modulator is amplified in power amplifier 13 and radiated at antenna 14.

In FIG. 3 the wave is received on antenna 15 by FM tuner 16 which provides a main channel output A plus B, and which feeds a subcarrier output to a subcarrier receiver 17 which provides an output A minus B. By means of phase inverter tube 18, opposite-phased signals are fed from cathode resistor 20 and plate resistor 19 through mixing resistors 21 and 23 to combining resistors 26 and 25. Condensers 27 and 28 are blocking condensers. The sum combination, A plus B, is fed through mixing resistors 22 and 24 to the combining resistors 26 and 25 to provide the sum combination $(A+B)+(A-B)=2A$ to amplifier 30, and the difference combination $$(A+B)-(A-B)=2B$$

to amplifier 29. The amplifiers therefore provide the separated outputs of transmitter microphones A and B (FIG. 1) in speakers A and B of FIG. 3.

I have found that there are several causes of unequal time delay between the main and subcarrier channels on the FM transmitting and receiving system. Time delay is introduced in the passage of the difference combination through the subcarrier generator 3 and its filters (FIG. 1) and through the subcarrier receiver 17 and its selecting filter (FIG. 3). With the direct FM type of modulator (e.g. an oscillator with a reactance tube), there is more time delay in the subcarrier channel than in the main channel. Correction for that type of transmitter combination then calls for insertion of time delay in the main channel by an amount equal to that brought about in the subcarrier channel. For this purpose I introduce a delay network D in the transmitter of FIG. 1. The time delay network, is of the low-pass filter type, and is inserted between terminals 4, 6, and 5, 7. In the subcarrier circuit terminals 8 and 9 are connected or "jumped."

Figure 2:
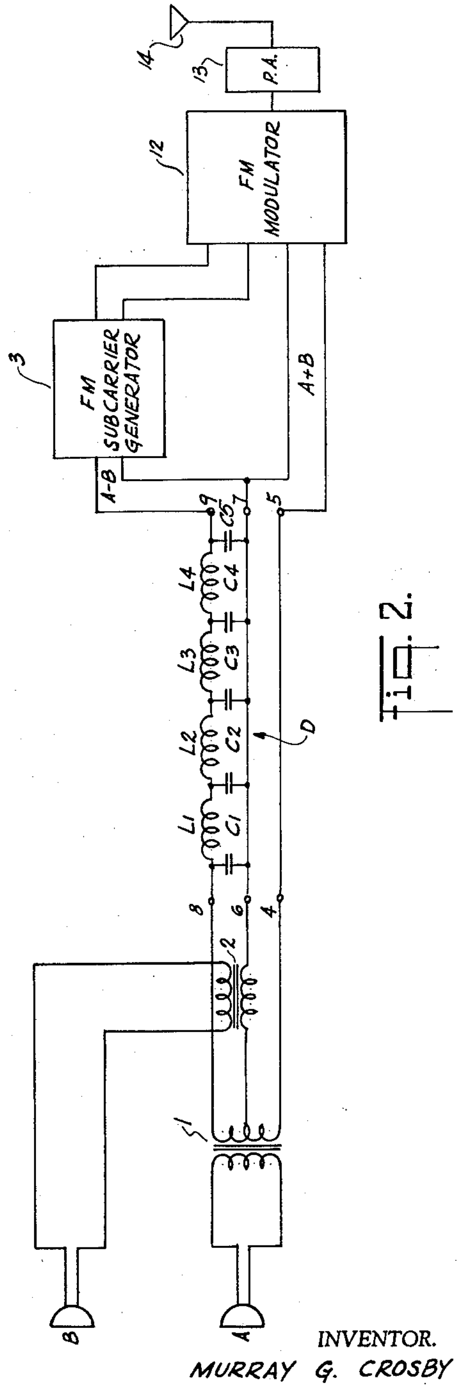
FIG. 2 is a similar diagram for a carrier and subcarrier transmitter having delay means in the subcarrier channel.
Figure 2:
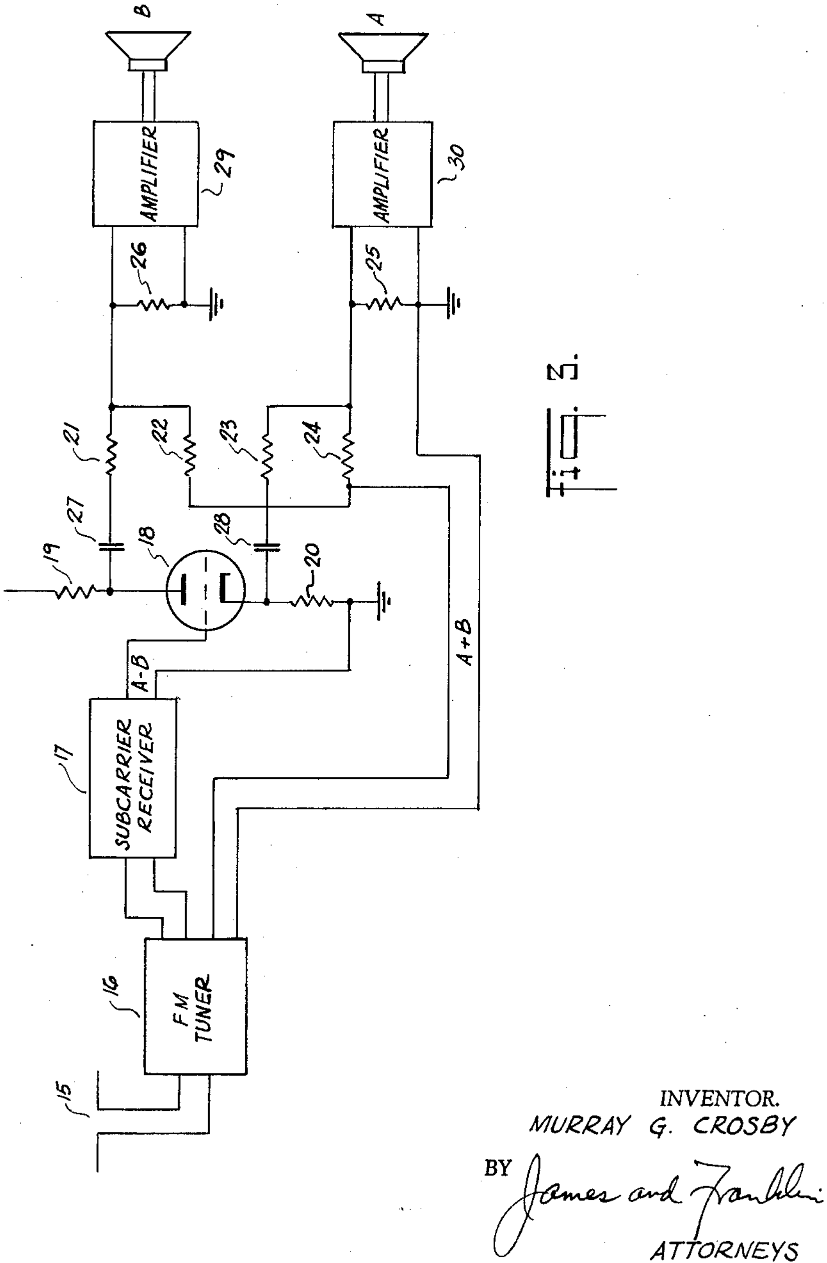

For the phase-shift or indirect type FM modulator such as described in Armstrong's U.S. Patent No. 2,630,497, which utilizes an auxiliary phase-shift modulator to apply the subcarrier channel, there may be more time delay in the main channel than there is in the subcarrier channel. This would call for time delay in the subcarrier channel. Such an arrangement is shown in FIG. 2, in which the delay network D is inserted between terminals 6, 8 and 7, 9. Terminals 4 and 5 are connected or jumped.

Whether the time delay occurs in the main channel or the subcarrier channel thus depends upon the particular type of transmitting equipment being employed.

The time delay network shown is one form of network which may be employed. There are many other known forms of constant-amplitude phase equalizing circuits which may be applied in the manner of phase equalization of video and facsimile transmitting circuits.

The undesired delay for which the delay network compensates is significant in the higher audio frequencies although not in the lower audio frequencies. The time delay in microseconds may be substantially the same, but the phase difference resulting from the time delay may be too small to be significant in low audio frequencies, but becomes large enough to change the result of the arithmetic summation and subtraction in the higher audio frequencies. The delay network is compensatory, and the absolute time delay produced may be the same for all frequencies, but the corrective effect or compensation is of importance for the high frequencies.

It is obviously more economical to apply the phase correction at the transmitter where it may be done once for all receivers, than to apply correction at the receivers. This simplifies the receiver system, and allows one delay network to be applied to correct the reception for all receivers.

Figure 4:
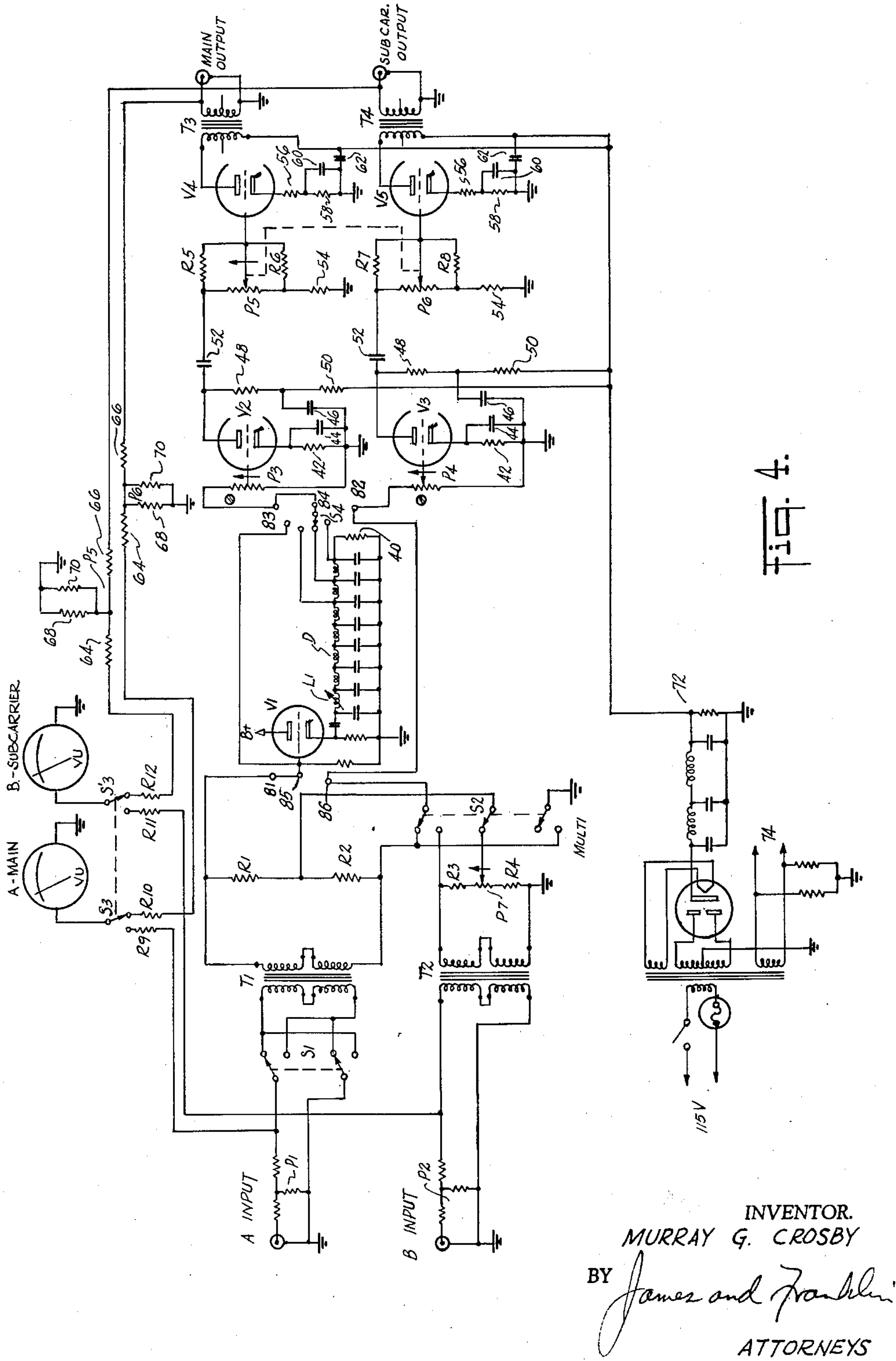
FIG. 4 is a detailed wiring diagram for a mixing amplifier with time delay means.

FIG. 4 shows in detail the complete circuit of one particular mixing amplifier which performs the function of mixing the two microphone channels at the transmitter to provide the sum and difference outputs, together with insertion of the desired time delay in the proper channel. As the diagram is drawn the time delay network is shown inserted in the carrier channel, and thus corresponds to FIG. 1. By a simple change in wiring the time delay network may be connected in the subcarrier channel.

FIG. 4 corresponds generally to what is shown in FIG. 1 between the microphones A and B at the left, and the terminals 5, 7 and 9 at the right end of the delay network. However, in FIG. 4 there are additions in the nature of refinements, such as switching means for phase reversal; an impedance changing tube at the beginning of the delay network per se; switching means to change the length or number of sections of the delay network thereby changing the amount of delay; and amplifier tubes with potentiometers for adjusting the relative outputs. These things all make for flexibility in the operation of the transmitter. At the right end of FIG. 4 the "main output" corresponds to the A plus B channel at the bottom of FIG. 1, while the "subcarrier output" corresponds to the A minus B channel ahead of unit 3 at the top of FIG. 1. This reversal of position corresponds to the reversal of microphones A and B at the left end of FIGS. 1 and 4.

The general purpose of the mixing amplifier of FIG. 4 is to take the separate A microphone and B microphone inputs fed in at the left and mix them to provide A plus B output at the "main output" on the right and A minus B at the "subcarrier output" on the right. The A and B inputs are fed through pads P1 and P2 which are present for matching and level-adjusting purposes. Switch S1 reverses the polarity of channel A, so as to compensate for corresponding reversals of either the input from channel A or channel B.

Transformers T1 and T2 together with resistors R1, R2, R3 and R4 are connected to provide the sum combination in the upper amplifier chain, and the difference combination in the lower amplifier chain. Potentiometer P7 adjusts for the balance of levels in the mixing combination. Switch S2 allows the choice of the mixed outputs A plus B and A minus B at the main and subcarrier outputs or, where mixing is not desired, straight multiplex operation of A and B outputs may be obtained by throwing the switch to the down position marked for "multi." For example, a monaural voice program may be sent over one channel, and background music over the other.

Cathode follower V1 together with delay network D is shown in the A plus B chain of amplifiers, but may be connected in the A minus B, or lower chain of amplifiers, by breaking the connection or jumpers between terminals 81 and 85, and 86 and 82, then connecting or jumping terminals 85 and 86, and 84 and 82, and connecting or jumping terminals 81 and 83. Switch S4 cuts out or in, sections of the time delay network D to adjust for the proper time delay. Coil L1 of network D is adjustable for vernier control. Potentiometers P3 and P4 adjust the gain of the two amplifier chains for equal amplitude at the main and subcarrier outputs. Tubes V2 and V3 are audio amplifiers. Resistors 42 by-passed by capacitors 44 provide cathode bias for amplifiers V2 and V3. Resistors 48 are the plate resistors of the resistance-coupled amplifiers and capacitors 52 are blocking condensers. Capacitors 46 are by-pass condensers and resistors 50 are the coupling resistors. Potentiometers P5 and P6, which are ganged for simultaneous movement, provide a gain control for the output amplitude. These potentiometers are shunted by resistors R5, R6, R7, and R8 to provide equality in gain control of the two potentiometers. Resistors 54 form a small part of potentiometers P5 and P6.

Output amplifiers V4 and V5 feed transformers T3 and T4 to provide the main outputs and subcarrier outputs. Resistors 56 and 58 of amplifiers V4 and V5 provide self-bias. Partial feedback is obtained to adjust the load applied to the transformer by T4 and T5 by bypassing part of the cathode resistor 58 by means of bypass condensers 60. Condensers 62 are by-pass condensers. These outputs are metered by VU meters "A-Main" and "B-subcarrier," which are either connected to the main output through attenuating and matching pads P5 and P6, made up of resistors 64, 66, 68 and 70, or to the separate inputs through matching resistors R9, R10, and R11, R12. Resistors 68 and 70 are paralleled to obtain the desired value. Choice of metering on either input or output is made by ganged switches S3 and S3'.

Specific quantitative values are next given for the components in the circuit shown in FIG. 4, but it is to be understood that these quantitative values are given solely by way of example, and are not intended to be in limitation of the invention.

In pads P1 and P2 the four series resistors are each 180 ohms, and the two shunt resistors are each 820 ohms. The transformers T1 and T2 are Type HA–108 made by United Transformer Corporation. The resistors R1, R2, R3 and R4 are each 270 ohms, and the balancing potentiometer P7 has a value of 50 ohms.

The tube V1 is a type 6C4. Its grid resistor is 10K ohms, its cathode resistor 820 ohms, and its coupling condenser leading to the delay network D is 25 mfd. The shunt condensers in the delay network are each 0.02 except the first which is 0.01 mfd. Each of the coils of the delay network has an inductance of 6.25 mh. The terminal resistor 40 is 560 ohms.

The potentiometers P3 and P4 are each 10K ohms. The tubes V2, V3, V4 and V5 are types 12AU7. The resistors 42 are each 120 ohms. The capacitors 44 are each 25 mfd., and capacitors 46 are each 0.1 mfd. Resistors 48 are 47K ohms. Resistors 50 are 2700 ohms. Capacitors 52 are 0.5 mfd. Potentiometers P5 and P6 are each 100K ohms. The two resistors 54, and also the resistors R5, R6, R7, and R8, are each 47K ohms. Resistors 56 are 390 ohms each. Resistors 58 are 560 ohms each. Bypass capacitors 60 are each 25 mfd., and capacitors 62 are each 0.1 mfd.

The transformers T3 and T4 are type HA–133 made by United Transformer Corporation.

Resistors R9 and R11 are each 3600 ohms. Resistors R10 and R12 are each 1000 ohms. In the two like pads generally designated P5 and P6 the resistors 64 are each 4700 ohms; the resistors 66 are each 1200 ohms; the resistors 68 are each 1.2K ohms; and the resistors 70 are each 10K ohms.

The power supply shown in the lower part of the diagram may be conventional, and needs no detailed description. Anode potential is supplied at the filter terminal 72. Cathode heater current is supplied at 74, and runs to the heaters of the cathodes in the five tubes shown. These heaters and their wiring are omitted as usual in order to simplify the diagram.

The technique of adjustment of the time delay network is to insert time delay until the sum and difference networks at the receiver outputs completely cancel one of the channels when that channel is not being fed into the sum and difference mixing amplifier. Another procedure is to use an audio tone on the two inputs to the mixing amplifier, and observe the phase relation as a Lissajous figure on an oscilloscope. The horizontal plates of the oscilloscope are fed from the main channel output and the vertical plate by the subcarrier channel. Under these circumstances a 45 degree line will appear when the time delay equalization is proper. As the time delay deviates from the proper value, the line will open up into an ellipse.

It is believed that the method and apparatus of my invention, as well as the advantages thereof, will be apparent from the foregoing detailed description. Although I have shown and described a system in which one channel is a frequency modulation channel, and the other is a superaudible subcarrier, it will be understood that the time delay feature of my invention is applicable to any system in which the summation and subtraction signals are transmitted over two channels, whether they be amplitude modulation, phase modulation, frequency modulation, or any other combination of any two of the same, or in combination with subcarriers of the same, where the delay in one channel is greater than that in the other.

It will also be apparent to those skilled in the art that addition and subtraction by means of a transformer combination as shown in FIGS. 1, 2 and 4 is not essential. Arrangements of phase inverters and resistance networks may also be used, as shown for example in FIG. 3. In some cases, under conditions of mass production of receiving equipment, such an alternative is preferable.

It will therefore be understood that while I have shown and described my invention in a preferred form, changes may be made without departing from the scope of the invention, as sought to be defined in the following claims. In the claims the term "speaker" is intended to include other translating devices such as a headphone.

The broad reference in some claims to transmitting the summation and subtraction signals over two separate channels, is intended to include channels of any kind, but some claims deal specifically with a frequency modulation carrier having a superaudible subcarrier, which is an advantageous and preferred form of the invention. In the claims, when dealing with modulation, the expression "substantially the full frequency range" of the audio signal is intended to mean an audio frequency range large enough to produce a substantial improvement in signal-to-noise ratio. Also, the expression "substantial improvement in signal-to-noise ratio" does not mean an increase in ratio in both channels. As explained in my Patent 2,851,532, an improvement in the poorer channel may be considered an overall "improvement" in signal-to-noise ratio, because the increase in the poorer channel is important, compared to a decrease in the better channel, and also because equalization in both channels is itself desirable.

I claim:

1. Apparatus for the binaural transmission of sound on two channels having different components such that audio frequencies are delayed more in one than the other, said apparatus comprising spaced microphones, means to add the microphone outputs to obtain a summation audio signal, means to subtract the microphone outputs to obtain a subtraction audio signal, means to delay the undelayed one of the summation and subtraction audio signals over substantially the complete frequency range an amount to compensate for the aforesaid delay in order to maintain synchronism, means to transmit the summation signal over one channel, and means to transmit the subtraction signal over the other channel, said delay means at the transmitter helping maintain separation of the binaural channels at the receiver over substantially the full audio frequency range.

2. Apparatus for the binaural communication of sound on two channels having different components such that audio frequencies are delayed more in one than the other, said apparatus comprising spaced microphones, means to add the microphone outputs to obtain a summation audio signal, means to subtract the microphone outputs to obtain a subtraction audio signal, means to delay the undelayed one of the summation and subtraction audio signals over substantially the complete frequency range an amount to compensate for the aforesaid delay in order to maintain synchronism, means to transmit the summation signal over one channel and means to transmit the subtraction signal over the other channel, and receiving apparatus including means to derive the summation and subtraction signals from the channels, means to add the summation and subtraction signals to reproduce one of the microphone outputs, and means to subtract the two signals in order to reproduce the other microphone output, said delay means at the transmitter helping maintain separation of the binaural channels at the receiver over substantially the full audio frequency range.

3. Apparatus for improving the signal-to-noise ratio in the binaural transmission of sound on two channels one of which is used also as a main channel for monaural listeners, said apparatus comprising spaced microphones, means to add the microphone outputs to obtain a summation audio signal, means to subtract the microphone outputs to obtain a subtraction audio signal, means to delay one of said summation and subtraction audio signals relative to the other over substantially the complete frequency range, means to transmit the summation signal over substantially its full frequency range over the main channel, and means to transmit the subtraction signal over substantially its full frequency range over the other channel, said delay means at the transmitter helping maintain separation of the binaural channels at the receiver over substantially the full audio frequency range.

4. Apparatus for improving the signal-to-noise ratio in the binaural communication of sound on two channels one of which is used also as a main channel for monaural listeners, said apparatus comprising spaced microphones, means to add the microphone outputs to obtain a summation audio signal, means to subtract the microphone outputs to obtain a subtraction audio signal, means to delay one of said summation and subtraction audio signals relative to the other over substantially the complete frequency range, means to transmit the summation signal over substantially its full frequency range over the main channel, and means to transmit the subtraction signal over substantially its full frequency range over the other channel, and receiving apparatus including means to derive the summation and subtraction signals from the channels, means to add the summation and subtraction signals to reproduce one of the microphone outputs, and means to subtract the two signals in order to reproduce the other microphone output, the aforesaid delay means helping to maintain synchronism at the receiver, said delay means at the transmitter helping maintain separation of the binaural channels at the receiver over substantially the full audio frequency range.

5. Apparatus for the binaural transmission of sound on a frequency modulation carrier and superaudible subcarrier, said apparatus comprising two sound sources, means to add the outputs of said sound sources to obtain a summation audio signal, means to subtract the said outputs to obtain a subtraction audio signal, means to delay one audio signal relative to the other over substantially the complete frequency range, a subcarrier generator, means to modulate the subcarrier by the subtraction signal, means to combine the modulated subcarrier with the summation signal, means to frequency modulate a carrier by means of the combined signal, and means to transmit the resulting modulated carrier, said delay means serving to maintain synchronism by compensating for a phase delay of higher frequencies caused by the different apparatus used for the two channels, said delay means at the transmitter helping maintain separation of the binaural channels at the receiver over substantially the full audio frequency range.

6. Apparatus for the binaural communication of sound on a frequency modulation carrier and superaudible subcarrier, said apparatus comprising two sound sources, means to add the outputs of said sound sources to obtain a summation audio signal, means to subtract the said outputs to obtain a subtraction audio signal, means to delay one audio signal relative to the other over substantially the complete frequency range, a subcarrier generator, means to modulate the subcarrier by the subtraction signal, means to combine the modulated subcarrier with the summation signal, means to frequency modulate a carrier by means of the combined signal, and means to transmit the resulting modulated carrier, said delay means serving to maintain synchronism by compensating for a phase delay of higher frequencies caused by the different apparatus used for the two channels, and receiver apparatus including means to demodulate the carrier, means to separate the subcarrier from the summation signal, means to demodulate the subcarrier to obtain the subtraction signal, means to add the summation and subtraction signals to reproduce one sound source output, means to subtract the said two signals to reproduce the other sound source output, spaced reproducers, and means to supply the reproduced outputs to said spaced reproducers, said delay means at the transmitter helpin maintain separation of the binaural channels at the receiver over substantially the full audio frequency range.

7. Apparatus for the binaural transmission of sound on a frequency modulation carrier and superaudible subcarrier, said apparatus comprising two sound sources, means to add the outputs of said sound sources to obtain a summation audio signal, means to subtract the said outputs to obtain a subtraction audio signal, means to delay one audio signal relative to the other over substantially the complete frequency range, a subcarrier generator, means to modulate the subcarrier over substantially the full frequency range of the subtraction signal, means to combine the modulated subcarrier with substantially the full frequency range of the summation signal, means to frequency modulate a carrier by means of the combined signal, and means to transmit the resulting modulated carrier, said delay means compensating for a phase delay caused by the different apparatus used for the two channels, said delay means at the transmitter helping maintain separation of the binaural channels at the receiver over substantially the full audio frequency range.

8. Apparatus for the binaural communication of sound on a frequency modulation carrier and superaudible subcarrier, said apparatus comprising two sound sources, means to add the outputs of said sound sources to obtain a summation audio signal, means to subtract the said outputs to obtain a subtraction audio signal, means to delay one audio signal relative to the other over substantially the complete frequency range, a subcarrier generator, means to modulate the subcarrier over substantially the full frequency range of the subtraction signal, means to combine the modulated subcarrier with substantially the full frequency range of the summation signal, means to frequency modulate a carrier by means of the combined signal, and means to transmit the resulting modulated carrier, said delay means compensating for a phase delay caused by the different apparatus used for the two channels, and receiver apparatus including means to demodulate the carrier, means to separate the subcarrier from the summation signal, means to demodulate the subcarrier to obtain the subtraction signal, means to add the summation and subtraction signals to reproduce one sound source output, means to subtract the said two signals to reproduce the other sound source output, spaced reproducers, and means to supply the reproduced outputs to said spaced reproducers, said delay means at the transmitter helping maintain separation of the binaural channels at the receiver over substantially the full audio frequency range.

9. Apparatus for improving the signal-to-noise ratio in the binaural transmission of sound on two channels, said apparatus comprising two sound sources, means to add the outputs of said sound sources to obtain a summation audio signal, means to subtract the said outputs to obtain a subtraction audio signal, means to compensatorially delay one of said audio signals relative to the other over substantially the complete frequency range, a superaudible subcarrier generator, means to modulate the superaudible subcarrier by the subtraction signal, means to combine the modulated subcarrier with the summation signal, a carrier generator, means to frequency modulate the carrier by means of the combined signal, and means to transmit the resulting modulated carrier, said delay means at the transmitter helping maintain separation of the binaural channels at the receiver over substantially the full audio frequency range.

10. Apparatus for improving the signal-to-noise ratio in the binaural communication of sound on two channels, said apparatus comprising two sound sources, means to add the outputs of said sound sources to obtain a summation audio signal, means to subtract the said outputs to obtain a subtraction audio signal, means to compensatorially delay one of said audio signals relative to the other over substantially the complete frequency range, a superaudible subcarrier generator, means to modulate the superaudible subcarrier by the subtraction signal, means to combine the modulated subcarrier with the summation signal, a carrier generator, means to frequency modulate the carrier by means of the combined signal, and means to transmit the resulting modulated carrier, and receiver apparatus including a frequency modulation detector to demodulate the carrier, means to separate the subcarrier from the summation signal, means to demodulate the subcarrier to obtain the subtraction signal, means to add the summation and subtraction signals to reproduce one sound source output, means to subtract the said two signals to reproduce the other sound source output, spaced reproducers, and means to supply the reproduced outputs to said spaced reproducers, the arrangement being such that the subcarrier as well as the carrier is modulated over so much of the full frequency range of the audio signals carried thereby that a substantial improvement in signal-to-noise ratio is obtained, said delay means at the transmitter helping maintain separation of the binaural channels at the receiver over substantially the full audio frequency range.

11. Apparatus for improving the signal-to-noise ratio in the binaural transmission of sound on two channels, said apparatus comprising two sound sources, means to add the outputs of said sound sources to obtain a summation audio signal, means to subtract the said outputs to obtain a subtraction audio signal, means to compensatorially delay one of said audio signals relative to the other over substantially the complete frequency range, a superaudible subcarrier generator, means to modulate the superaudible subcarrier over substantially the full frequency range of the subtraction signal, means to combine the modulated subcarrier with substantially the full frequency range of the summation signal, a carrier generator, means to frequency modulate the carrier by means of the combined signal, and means to transmit the resulting modulated carrier, said delay means at the transmitter helping maintain separation of the binaural channels at the receiver over substantially the full audio frequency range.

12. Apparatus for improving the signal-to-noise ratio in the binaural communication of sound on two channels, said apparatus comprising two sound sources, means to add the outputs of said sound sources to obtain a summation audio signal, means to subtract the said outputs to obtain a subtraction audio signal, means to compensatorially delay one of said audio signals relative to the other over substantially the complete frequency range, a superaudible subcarrier generator, means to modulate the superaudible subcarrier over substantially the full frequency range of the subtraction signal, means to combine the modulated subcarrier with substantially the full frequency range of the summation signal, a carrier generator, means to frequency modulate the carrier by means of the combined signal, and means to transmit the resulting modulated carrier, and receiver apparatus including a frequency modulation detector to demodulate the carrier, means to separate the subcarrier from the summation signal, means to demodulate the subcarrier to obtain the subtraction signal, means to add the summation and subtraction signals to reproduce one sound source output, means to subtract the said two signals to reproduce the other sound source output, spaced reproducers, and means to supply the reproduced outputs to said spaced reproducers, the arrangement being such that the subcarrier as well as the carrier is modulated over so much of the full frequency range of the audio signals carried thereby that a substantial improvement in signal-to-noise ratio is obtained, said delay means at the transmitter helping maintain separation of the binaural channels at the receiver over substantially the full audio frequency range.

13. Apparatus for the binural transmission of sound on two channels having different components such that audio frequencies are delayed more in one than the other, said apparatus comprising spaced micrpohones, means to add the microphone outputs to obtain a summation audio signal, means to subtract the microphone outputs to obtain a subtraction audio signal, means to delay the undelayed one of the summation and subtraction audio signals over substantially the complete frequency range an amount to compensate for the aforesaid delay in order to maintain synchronism, means to transmit the summation signal over one channel, means to transmit the subtraction signal over the other channel, the delay means in the transmitter causing a delay greater than the undesried delay in the transmitter alone in order to anticipate and compensate for an additional undesired delay in the receiver, and said delay means at the transmitter helping maintain separation of the binaural channels at the receiver over substantially the full audio frequency range.

14. Apparatus for the binaural communication of sound on two channels having different components such that audio frequencies are delayed more in one than the other, said apparatus comprising spaced microphones, means to add the microphone outputs to obtain a summation audio signal, means to subtract the microphone outputs to obtain a subtraction audio signal, means to delay the undelayed one fo the summation and subtraction audio signals over substantially the complete frequency range an amount to compensate for the aforesaid delay in order to maintain synchronism, means to transmit the summation signal over one channel and means to transmit the subtraction signal over the other channel, and receiving apparatus including means to derive the summation and subtraction signals from the channels, means to add the summation and subtraction signals to reproduce one of the microphone outputs, means to subtract the two signals in order to reproduce the other microphone output, the delay means in the transmitter causing a delay greater than the undesired delay in the transmitter alone in order to anticipate and compensate for an additional undesired delay in the receiver, and said delay means at the transmitter helping maintain separation of the binaural channels at the receiver over substantially the full audio frequency range.

15. Apparatus for improving the signal-to-noise ratio in the binaural transmission of sound on two channels one of which is used also as a main channel for monaural listeners, said apparatus comprising spaced microphones, means to add the microphone outputs to obtain a summation audio signal, means to subtract the microphone outputs to obtain a subtraction audio signal, means to delay one of said summation and subtraction audio signals relative to the other over substantially the complete frequency range, means to transmit the summation signal over substantially its full frequency range over the main channel, means to transmit the subtraction signal over substantially its full frequency range over the other channel, the delay means in the transmitter causing a delay greater than the undesired delay in the transmitter alone in order to anticipate and compensate for an addtional undesired delay in the receiver, and said delay means at the transmitter helping maintain separation of the binaural channels at the receiver over substantially the full audio frequency range.

16. Apparatus for improving the signal-to-noise ratio in the binaural communication of sound on two channels one of which is used also as a main channel for monaural listeners, said apparatus comprising spaced microphones, means to add the microphone outputs to obtain a summation audio signal, means to subtract the microphone outputs to obtain a subtraction audio signal, means to delay one of said summation and subtraction signals relative to the other over substantially the complete frequency range, means to transmit the summation signal over substantially its full frequency range over the main channel, and means to transmit the subtraction signal over substantially its full frequency range over the other channel, and receiving apparatus including means to derive the summation and subtraction signals from the channels, means to add the summation and subtraction signals to reproduce one of the microphone outputs, and means to subtract the two signals in order to reproduce the other microphone output, the delay means in the transmitter casuing a delay greater than the undesired delay in the transmitter alone in order to anticipate and compensate for an additional undesired delay in the receiver, the aforesaid delay means helping to maintain synchronism at the receiver in order to maintain separation of the binaural channels over substantially the full audio frequency range.

References Cited in the file of this patent

UNITED STATES PATENTS 2,093,540 Blumlein ---------------- Sept. 21, 1937

2,609,535 Harmon ---------------- Sept. 2, 1952

2,654,806 Wilmotte ---------------- Oct. 6, 1953

2,654,885 Wilmotte ---------------- Oct. 6, 1953

2,698,379 Boelens et al. ---------------- Dec. 28, 1954

2,810,782 Hester ---------------- Oct. 22, 1957

2,851,532 Crosby ---------------- Sept. 9, 1958

FOREIGN PATENTS 540,185 Great Britain ---------------- Oct. 8, 1941